United States Patent [19]

Sato

[11] 4,183,461
[45] Jan. 15, 1980

[54] FAULT-DIAGNOSING METHOD FOR AN ELECTRONIC COMPUTER

[75] Inventor: Fumitaka Sato, Oume, Japan

[73] Assignee: Tokyo Shibaura Electric Co., Ltd., Japan

[21] Appl. No.: 886,901

[22] Filed: Mar. 14, 1978

[30] Foreign Application Priority Data

Mar. 14, 1977 [JP] Japan ............................. 52-27109

[51] Int. Cl.² ............................................. G06F 11/06
[52] U.S. Cl. .................................... 235/304; 364/200
[58] Field of Search ............ 235/303, 304, 304.1; 364/200

[56] References Cited

U.S. PATENT DOCUMENTS 3,904,860   9/1975   Huber et al. ................. 235/304.1 X
3,999,053  12/1976   Dalmasso ....................... 364/200 X

*Primary Examiner*—Jerry Smith
*Attorney, Agent, or Firm*—Finnegan, Henderson, Farabow & Garrett

[57] ABSTRACT

A fault-diagnosing apparatus and method for an electronic computer designed to diagnose a fault occurring in constituent circuits formed of a plurality of packages according to a signal denoting the status of a sequential circuit in the selected one of the packages, which comprises a fault-diagnosing unit for diagnosing a fault occurring in any of the sequential circuits; an exclusively fault-diagnosing circuit provided in the respective packages; and a common exclusively fault-diagnosing bus to which the output terminals of said exclusively fault-diagnosing circuits are jointly connected, and wherein the exclusively fault-diagnosing circuit sends forth to the exclusively fault-diagnosing bus signals denoting the interior status of the sequential circuit included in the package selected by the fault-diagnosing unit; and the fault-diagnosing unit diagnoses a fault occurring in any of said sequential circuits from the signal received through the bus.

10 Claims, 10 Drawing Figures

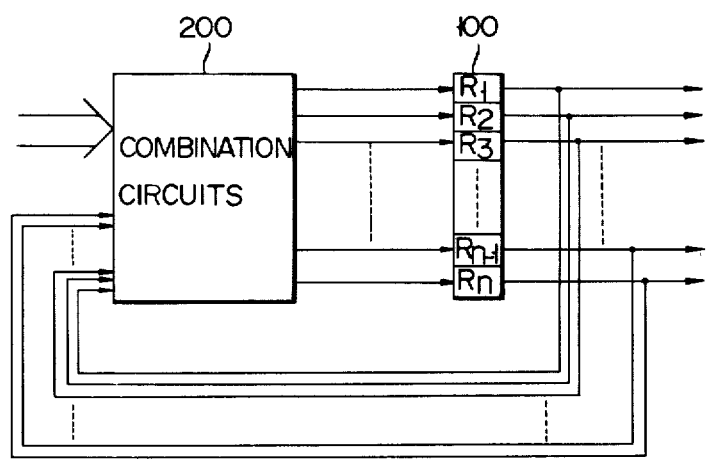
F I G. 4

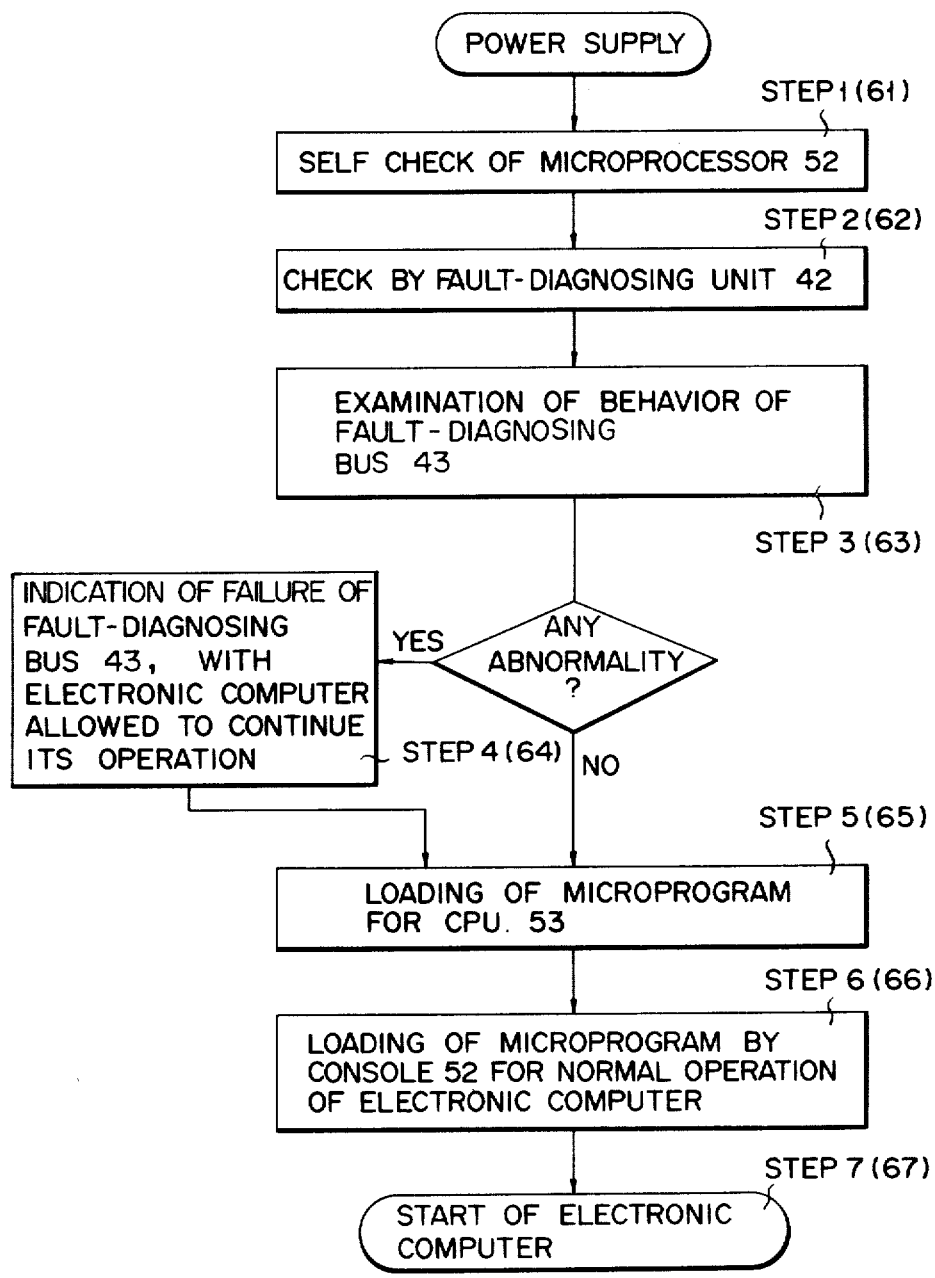

FAULT-DIAGNOSING METHOD FOR AN ELECTRONIC COMPUTER

BACKGROUND OF THE INVENTION

This invention relates to a fault-diagnosing method for an electronic computer, and more particularly to an improved fault-diagnosing method provided with a bus for an exclusive diagnosis of a fault.

The conventional fault-diagnosing apparatus for an electronic computer has generally been designed to inform a fault-diagnosing unit of the state of the respective sections of the electronic computer through data paths provided for the execution of the normal function of the electronic computer.

FIG. 1 schematically illustrates a prior art electronic computer provided with a fault-diagnosing apparatus operated by utilizing the above-mentioned data path. There will now be described the concrete arrangement of the known electronic computer shown in FIG. 1. A scratch pad memory 1 is connected directly to a main data path 6. Groups 2, 3 of registers are connected to the main data path 6 indirectly through a shifter 4 and an arithmetic logic operation unit (ALU) 5. To the main data path 6 is connected a main memory 7 through a write data register 8. A fault-diagnosing unit 9 is connected to the data path 6.

The prior art fault-diagnosing apparatus based on the utilization of the main data path 6 of FIG. 1 can indeed effectively diagnose faults occurring in the respective data-processing sections of an electronic computer. Where, however, only a very little output signal is produced by a section, for example, a sequential circuit formed of a complicated combination of memory elements and logic elements collectively to perform a large function or a section carrying out a particular definite function, then considerable difficulties arise in efficiently diagnosing faults simply by utilizing the data bus provided for the execution of the normal function of an electronic computer.

To date, various improved fault-diagnosing apparatuses have been proposed. One of these apparatuses is the type in which an exclusive signal line for diagnosis of a fault is provided between a fault-diagnosing unit and the main flip-flop circuits of the electronic computer control circuits which are to be diagnosed for efficient diagnosis of a fault if occurring in any of said control circuits. Another proposed fault-diagnosing apparatus is the type in which a plurality of memory elements are connected in the form of a loop at the time of diagnosing a fault to facilitate said diagnosis.

FIG. 2 schematically shows the arrangement of the proposed electronic computer in which signal lines are set between a fault-diagnosing unit and the main flip-flop circuit of control circuits being diagnosed. With the fault-diagnosing unit of FIG. 2, control circuit 20 is formed of a plurality of packages 21-1 through 21-n. The circuit in the package 21-1 may be assumed to consist of a plurality of flip-flop circuits 23 combined with combinational circuits 22 for supplying input signals to said flip-flop circuits 23. The other packages 21-2 through 21-n are each likewise formed of a plurality of flip-flop circuits combined with combinational circuits for supplying input signals to said flip-flop circuits (not shown). Selectors 24-1 through 24-n are provided for the respective packages 21-1 through 21-n to send status signals of flip-flops 23 to the fault-diagnosing unit 25. The input terminals of the fault-diagnosing selectors 24-1 through 24-n are connected to the flip-flop circuits 23. The faul-diagnosing selectors 24-1 through 24-n pick up one of the flip-flop circuits 23 according to the control signals supplied from the fault-diagnosing unit 25 through a selection control line 26. In the case of a plurality of output lines 27-1, . . . 27-n, a group of flip-flops 23 are selected. A signal indicating the state of the selected flip-flop circuit 23 is transferred to the fault-diagnosing unit 25 through one of output signal lines 27-1 through 27-n.

FIG. 3 schematically indicates the concrete system arrangement of another proposed electronic computer in which the memory elements of the control circuit being diagnosed are connected in the form of a loop at the time of fault diagnosis. The arrangement of FIG. 3 differs from that of FIG. 2 only in that the output terminals of all the flip-flop circuits 23 of the packages 21-1 through 21-n are connected together in the form of a loop and that the loop has its contents shifted by one bit, each time a clock pulse is received from the fault-diagnosing unit 25, thereby causing the state of the respective flip-flop circuits to be read out to the fault-diagnosing unit 25. For convenience of description, the flip-flop circuits 23 and combinational circuits 22 included in the packages 21-1 through 21-n were arranged as illustrated in FIGS. 2, 3 and 5. Actually, however, the flip-flop circuits 23 are included in registers provided in the control circuits of an electronic computer, and the combinational circuits 22 represent those which supply an input signal to said registers. The registers and the combinational circuits 22 are constituents of a sequential circuit. The sequential circuit is generally formed of the type shown in FIG. 4. The sequential circuit of FIG. 4 comprises a register 100 and a combinational circuit 200. This sequential circuit is so arranged that an output signal from the register 100 is fed back to the combinational circuit 200. The flip-flop circuits of FIGS. 2, 3 and 5 represent the respective one-bit sections ($R_1$ to $R_n$) of the register 100. Generally, each of the control circuits of an electonic computer contains a plurality of sequential circuits. At least one sequential circuit is provided in each package. FIGS. 2, 3 and 5 show a sequential circuit typified by flip-flop circuits. The reason is that this invention primarily relates to means for indicating the interior condition of a sequential circuit in order to diagnose a fault occurring therein.

FIGS. 2 and 3 show only four of the flip-flop circuits 23 included in the respective packages 21-1 through 21-n. Generally, a single package contains ten and odd flip-flop circuits. Further, the respective packages 21-1 through 21-n often issue several to about ten bits for fault diagnosis.

However, the proposed fault-diagnosing apparatuses shown in FIGS. 2 and 3 have the following drawbacks. Referring to the fault-diagnosing apparatus of FIG. 2, a large number of input signal lines 27-1 through 27-n are connected to the fault-diagnosing unit 25. Though a logic circuit tends to be integrated with higher density due to the recent development of semiconductor techniques, yet it is impossible easily to increase the number of the input-output terminal pins of the packages. Therefore, the actual design of an electronic computer is often subject to limitations due to the impossibility of readily increasing said input and output terminal pins. Where an electronic computer is designed to render the whole of it compact and efficient, reduction in the number of input and output terminal pins becomes a very important problem. Further, the fault-diagnosing unit has to be provided with some means by which said unit can selectively send forth an output signal.

The control circuit shown in FIG. 3 provided with a fault-diagnosing unit 25 has the drawbacks that through a fewer number of input signals are supplied to said fault-diagnosing unit 25, yet it is necessary to provide special flip-flop circuits which can be operated not only at the ordinary mode, but also can act as shift registers at the time of diagnosis of faults; and that since the states of the respective flip-flop circuits 23 are read out in the specified order only by one bit each time, diagnosis of faults has to be effected by a complicated procedure.

Some commercially available IC part of an electronic computer is the type which has a selector function and can have a wired OR or bus arrangement, with the output terminal provided with an open collector circuit or try-state circuit. However, where, with either of the above-mentioned bus arrangements, the output terminal of any one of the constituent elements is short-circuited, then it is said that no effective method is now available to detect a constituent element which has become faulty.

The wired OR arrangement or bus arrangement has the drawback that where constituent elements increase in number, then the stray capacity of, for example, wiring also becomes large, causing the transmission of a signal to be much delayed. Namely, with the ordinary circuit, the waveform of a signal sharply rises or falls as indicated in broken line in FIG. 6. But the wired OR arrangement or bus arrangement in which a large number of packages are connected together has the drawback that the waveform of a signal rises or falls very gently as shown in solid line in said FIG. 6.

SUMMARY OF THE INVENTION

It is accordingly the object of this invention to provide an inexpensive fault-diagnosing method and apparatus for an electronic computer which is provided with a fewer number of input and output terminal pins, can dispense with any special flip-flop circuit, and is provided with an improved bus for diagnosis of faults, thereby assuring a quick, reliable performance.

According to an aspect of this invention, there is provided a fault-diagnosing method for an electronic computer system having a central processing unit including a plurality of packages, which comprises the steps of diagnosing a fault in any of the circuits by using fault-diagnosing circuits provided in the respective packages; providing a common exclusive fault-diagnosing bus to which the output terminals of the plural fault-diagnosing circuits are connected; and supplying the fault-diagnosing bus with signals denoting the state of the circuits which have been selected by a fault-diagnosing unit, wherein the fault-diagnosing unit receives the signals denoting the state of the circuits in the selected one of the packages which have been received through the exclusive fault-diagnosing bus so as to diagnose a fault which happens to occur in said selected package.

BRIEF DESCRIPTION OF THE DRAWINGS

FIG. 4 is a block diagram of a sequential circuit in a package to be diagnosed designated in accordance with the generic representation of a sequential circuit;

FIG. 10 is a flow chart showing the steps of loading a microprogram for an electronic computer and examining the behavoir of a bus for diagnosis of faults.

DETAILED DESCRIPTION OF THE PREFERRED EMBODIMENTS

Figure 5:
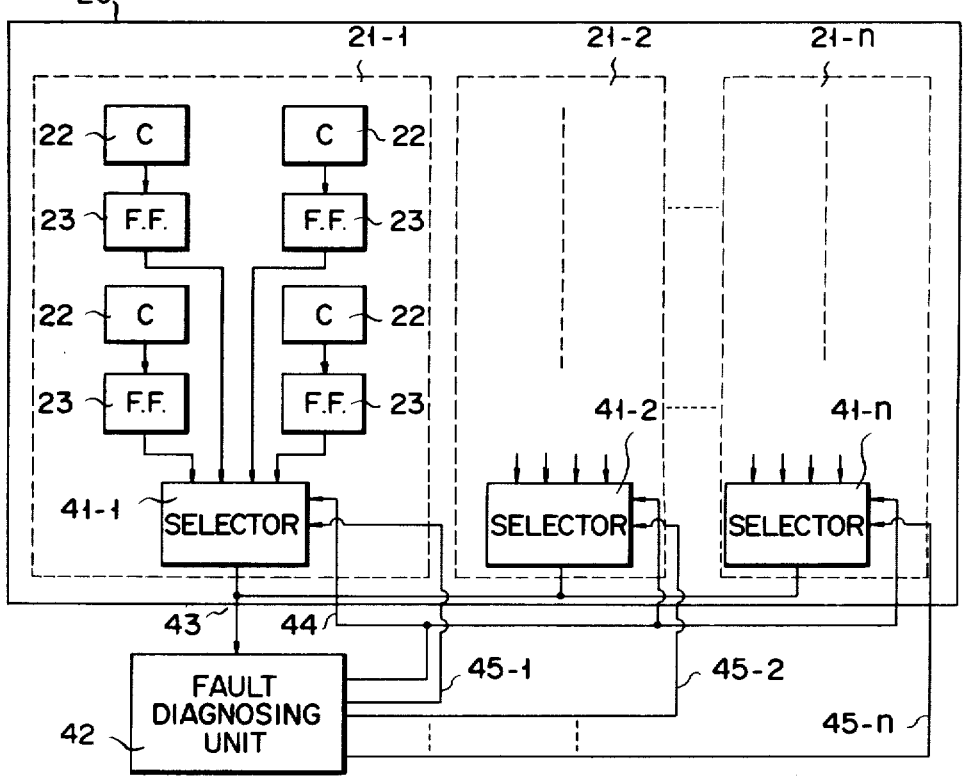
FIG. 5 is a block circuit diagram of a fault-diagnosing apparatus used for realizing the method of this invention.

FIG. 5 is a circuit block diagram of an example apparatus used for realizing the method of this invention.

Figure 1:
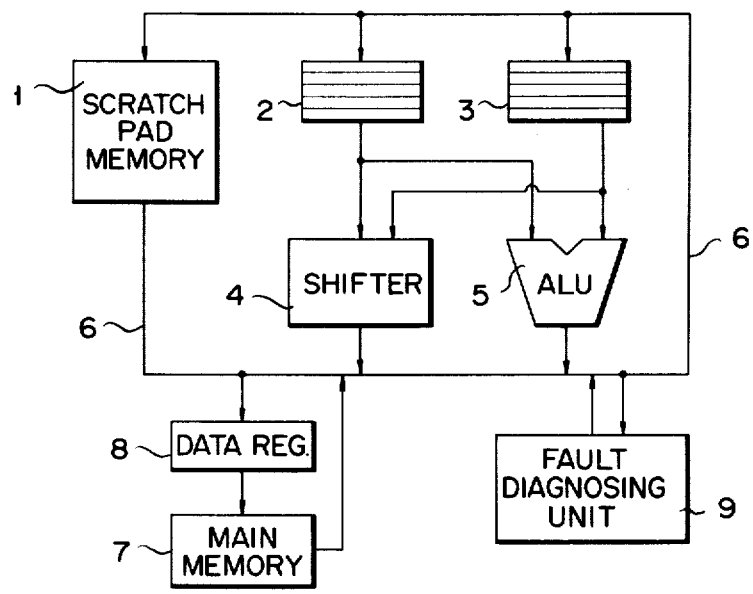
FIG. 1 is a block circuit diagram of a fault-diagnosing apparatus utilizing the data path of the prior art electronic computer.
Figure 2:
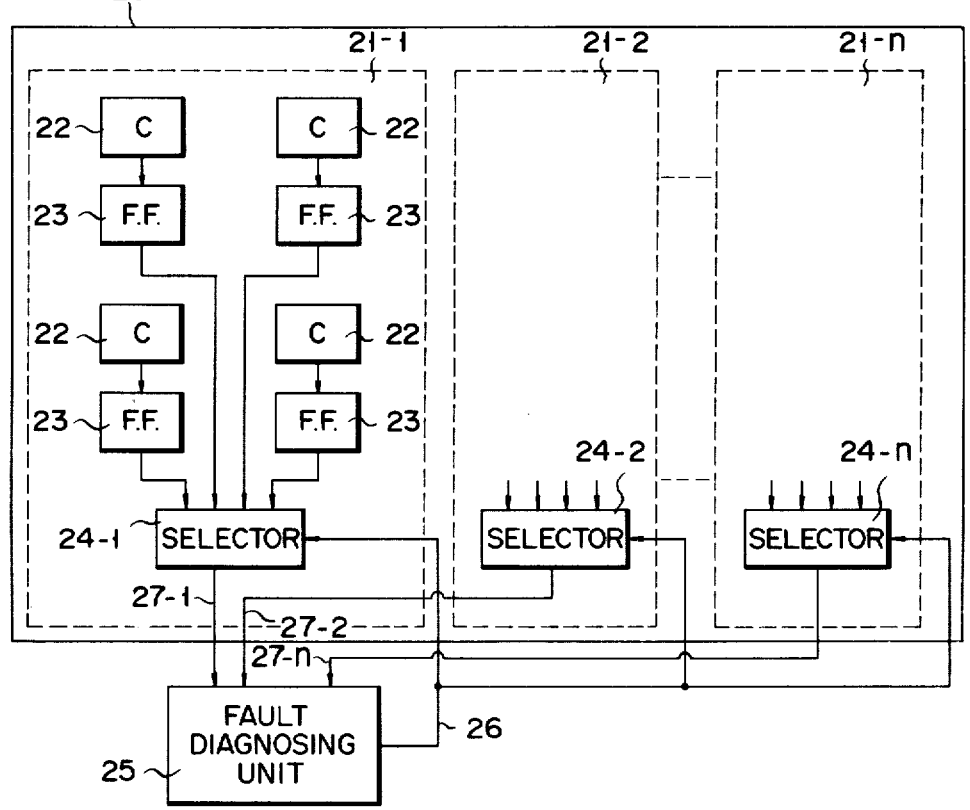
FIGS. 2 and 3 are block circuit diagrams of a fault-diagnosing apparatus for a circuit consisting of a plurality of packages being diagnosed.
Figure 3:
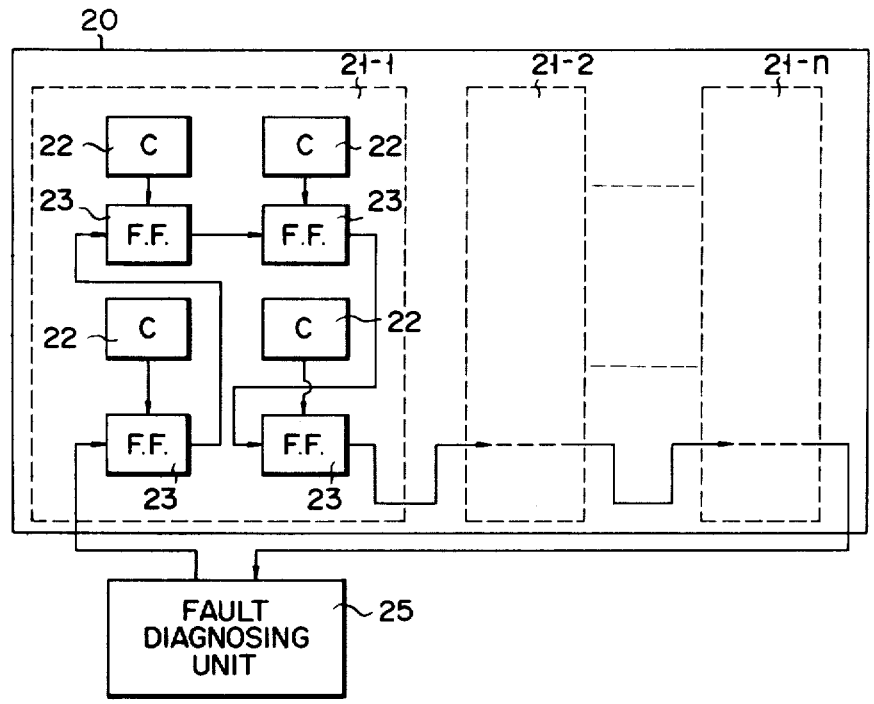

The control circuit 20 of FIG. 5 being diagnosed for the occurrence of a fault is of the same type as that of FIG. 2.

The fault-diagnosing selectors included in the respective packages 21-1 through 21-n are connected to the assembled control circuit 20 and flip-flop circuits 23 also included in the packages 21-1 through 21-n in substantially the same relationship as in the control circuit 20 of FIG. 2. Therefore, the parts of FIG. 5 the same as those of FIG. 2 are denoted by the same numerals, description of the connection therebetween being omitted.

Referring to FIG. 5, the selectors 41-1 through 41-n are connected to the flip-flop circuits 23 included in the packages 21-1 through 21-n to receive output signals from said flip-flop circuits 23. The selectors 41-1 through 41-n are connected to the fault-diagnosing unit 42 through a bus 43 for exclusively fault-diagnosing. The bus 43 will be expressed as a diagnosis bus in this specification. The selectors 41-1 through 41-n have an open collector or try-state output terminal and are used for diagnosis of the state of sequential circuits in the packages 21-1 through 21-n. The output terminals of these selectors 41-1 through 41-n are connected to the common bus 43.

The fault-diagnosing unit 42 is connected to a selection control signal line 44 for controlling the operation of the selectors 41-1 through 41-n, which are connected to the corresponding enable signal lines 45-1 through 45-n. When the fault-diagnosing unit 42 sends forth a selector selection control signal to the signal line 44 and an enable signal to the selected one of the enable signal lines 45-1 through 45-n, then a desired selector is selectively enabled. An output from the enabled selector is conducted to the fault-diagnosing unit 42 through the diagnosis bus 43.

With the embodiment of FIG. 5, the selectors 41-1 through 41-n are connected to the common selection control signal line 44. This arrangement can decrease the number of the output terminal pins of the fault-diagnosing unit 42. Further, the enable signal lines 45-1 through 45-n are connected to the corresponding selectors 41-1 through 41-n of the respective packages 21-1 through 21-n, thereby minimizing the number of input terminal pins required for diagnosis of the sequential circuits in the packages 21-1 through 21-n.

The diagnosis bus 43 acting as a common output line of the selectors 41-1 through 41-n is designed to be thrown out of use while an electronic computer or a central processing unit makes the normal operation. The fault-diagnosing unit 42 is supplied with a clock pulse at a longer interval than that applied during the normal operation of the electronic computer or the central processing unit.

If, therefore, scores of packages 21-1 through 21-n are connected by the diagnosis bus 43 having the wired OR or bus arrangement, it does not restrict the speed at which the electronic computer makes the normal operation.

There will now be described the clocks of the fault-diagnosing unit 42 by referring to FIG. 7 and FIG. 8.

Figure 6:
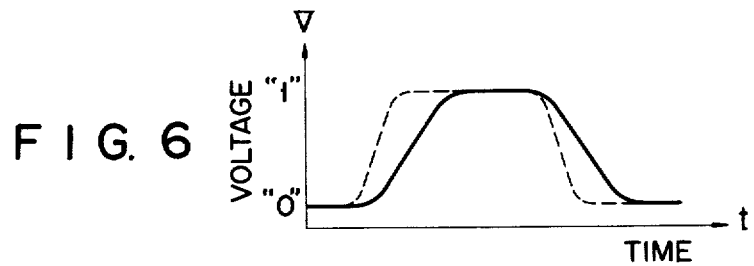
FIG. 6 shows waveforms illustrating the manner in which the waveform of a signal presents different patterns of rises and falls according to the kind of a signal transmission medium.
Figure 7:
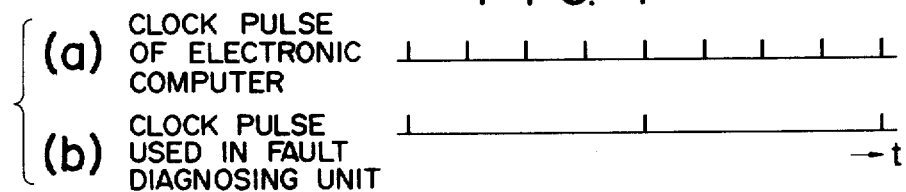
FIG. 7 indicates the waveforms of pulse signals, with comparison made between a time interval at which clock pulses are supplied to an electronic computer and that at which clock pulses are supplied to a fault-diagnosing unit.
Figure 9:
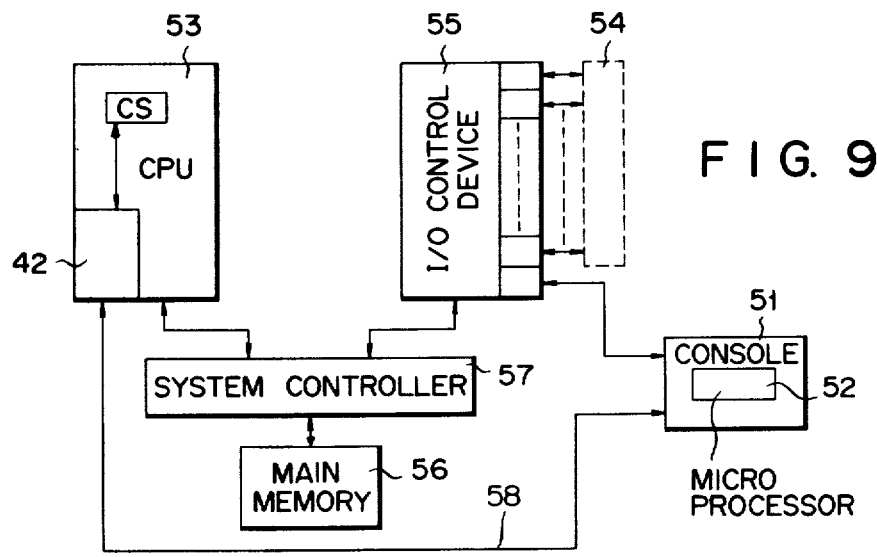
FIG. 9 is a block circuit diagram of an electronic computer concurrently having the function suitable for detecting the abnormality of a bus for diagnosis of faults.

FIG. 7(a) shows the timing in which a clock pulse is sent forth to an electronic computer while making the normal operation. FIG. 7(b) indicates the timing in which a clock pulse is supplied to the fault-diagnosing unit 42 of this invention. According to the embodiment of FIG. 5, the fault-diagnosing unit 42 is operated, as seen from FIG. 7, at a speed four times slower than that at which the electronic computer makes the normal operation. Though a state signal is transmitted through the diagnosis bus 43 at such a far slower speed than the normal operating speed of the electronic computer as indicated in the solid line in FIG. 6, the state of a sequential circuit in the control circuit 20 being diagnosed can be reliably read out to the fault-diagnosing unit 42. As later described, diagnosis of a fault is undertaken under control of the fault-diagnosing unit 42 included in a central processing unit (abbreviated as "CPU") as shown in FIG. 9. Therefore, variations or faults, if any, take place in a control circuit being diagnosed at the speed at which a clock pulse is supplied to the fault-diagnosing unit 42 or at a slower speed, thus making it possible to read out a signal denoting the state of the sequential circuit being diagnosed through the diagnosis bus 43.

Figure 8:
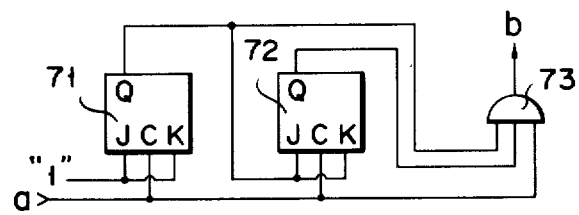
FIG. 8 shows the arrangement of a count-down circuit for obtaining a pulse signal of FIG. 7(b) from a pulse signal from FIG. 7(a)

For obtaining the clock pulse shown in FIG. 7(b), the fault-diagnosing unit 42 is provided with a clock pulse generator shown in FIG. 8. This clock pulse generator comprises two tandem-connected J-K flip-flop circuits 71, 72 for receiving a clock pulse a used with the CPU of FIG. 9. Three AND output signals, that is, Q outputs from said J-K flip-flop circuits 71, 72 and clock pulse a are conducted through an AND gate 73 to provide a clock pulse b for use with the fault-diagnosing unit 42. The clock pulse generator of FIG. 8 is the ordinary J-K flip-flop type count-down circuit, further description being omitted.

Now, the operation of the fault-diagnosing apparatus of FIG. 5 embodying this invention will be described. Any of the packages which is going to be diagnosed is selected by an enabling signal to enable the corresponding one of the selectors 41-1 through 41-n. Upon receipt of a selection control signal from the fault-diagnosing unit 42, the enabled selector is controlled and then an internal signal denoting the state of the selected package is supplied to the fault-diagnosing unit 42 through the diagnosis bus 43. Accordingly, the fault-diagnosing unit 42 can perform its function. This fault-diagnosing unit 42 may consist of a well-known unit.

Since the diagnosis bus 43 is exclusively used for diagnosis of faults, the occurrence of any failure in the bus 43 itself or any of the selectors 41-1 through 41-n, does not affect the normal operation of an electronic computer or a central processing unit at all. The diagnosis bus 43 is demanded to make a reliable operation at the time of fault diagnosis. It is little probable that two independent faults simultaneously arise in both a system including selectors 41-1 through 41-n and the diagnosis bus 43 and an electronic computer system being diagnosed. Therefore, this case can be omitted from the consideration of this invention.

However, should the failure of the diagnosis bus 43 or any of the selectors 41-1 through 41-n be left unnoticed, then it would be impossible to diagnose the state of those parts of an electronic computer which are used in its normal operation due to the fault of the diagnosis bus 43 and/or selectors 41-1 through 41-n. This problem can be resolved by periodically examining the behavior of the diagnosis bus 43. The object is attained by judging the behavior of the diagnosis bus 43 when an initialization is effected or when a microprogram is loaded at each time of power supply.

FIG. 9 is a block circuit diagram of an electronic computer which is provided with the fault-diagnosing apparatus of this invention and is designed concurrently to examine the behavior of the diagnosis bus 43. This electronic computer comprises a console 51; microprocessor included therein; CPU 53 used in the embodiment of FIG. 5; peripheral device 54; I/O control device 55 connected to the peripheral device 54; main memory 56; and system controller 57. The CPU 53 comprises a control storage (abbreviated as "CS") for holding a microprogram and the fault-diagnosing unit 42 of FIG. 5. A microprogram read out of the console 51 can be loaded in the CS upon receipt of an instruction from the fault-diagnosing unit 42 and the console 51 connected thereto by an exclusive interface 58.

The console 51 which is controlled by the microprocessor 52 not only acts as such, but also concurrently can be operated as a main control unit at the time of fault diagnosis or enables a microprogram to be properly loaded. Another function of the console 51 is to examine the behavior of the diagnosis bus 43 of FIG. 5.

There will now be described by reference to the flow chart of FIG. 10 the loading of the microprogram and the examination of the behavior of the diagnosis bus 43 embodying this invention. After power supply, the microprocessor 52 makes its own checking at a step 1(61). Thereafter, the behavior of the fault-diagnosing unit 42 is examined at a step 2(62). The behavior of the diagnosis bus 43 is checked at a step 3(63), thereby judging whether or not any abnormality has occurred in the behavior of the diagnosis bus 43. Should any irregularity be discovered in the behavior of the diagnosis bus 43, then said irregularity is notified to the console 51, at a step 4(64). At this time, however, since no fault has occurred, the electronic computer or CPU 53 continues still its normal operation. A microprogram is loaded in the CPU 53 at a step 5(65). Any irregularity is not discovered in the diagnosis bus 43, step 5 is executed after the step 3. A microprogram for the normal operation of the electronic computer is loaded by the console 51 at a step 6(66). Last, the operation of the whole electronic computer of FIG. 9 is started at a step 7(67). The steps 3,4 are the functions added to test the behavior of the diagnosis bus 43 for embodying this invention.

As mentioned above, the behavior of the diagnosis bus 43 is tested at each time of power supply. When the failure of the diagnosis bus 43 is detected, a message to the following effect is indicated on the console 51:

"Inform a maintenance operator of the detection of the failure of the fault-diagnosing bus. Since, however, the electronic computer can be normally operated, let it continue its own job."

When the diagnosis bus 43 becomes defective, a maintenance operator carries out the repair of the defective diagnosis bus 43 under a particular plan during the idle time of the electronic computer, namely, when the microprogram thereof indicates a blank section.

Where, with the prior art electronic computer, the fault-diagnosing apparatus fails, then this failure instantly causes the computer itself to stop its normal processing operation. However, this is not the case with an electronic computer provided with the fault-diagnosing method and apparatus of this invention. Namely, the failure of the fault-diagnosing apparatus need not be repaired, the moment it happens, but may be undertaken with sufficient time to spare and full preparation after a certain length of time, that is, during the idle time of the electronic computer when its microprogram indicates a blank section.

The foregoing embodiment relates to the case where this invention was applied to a fault-diagnosing apparatus for the control circuits of an electronic computer. However, the invention is also applicable to a register or data path located logically apart from the fault-diagnosing unit 42. Further with the above-mentioned embodiment, each control circuit comprised a plurality of flip-flop circuits. In the case of a combinational circuit, however, which generates a far smaller number of output signals than input signals received, greater difficulties arise in diagnosing the fault of such combinational circuit than when the ordinary combinational circuit is used. If, in this case, the output terminal of a circuit of simpler combination is connected to a fault-diagnosing bus, then fault diagnosis can be carried out more effectively.

As mentioned above, the fault-diagnosing method and apparatus of this invention comprising a bus for exclusively diagnosing has the advantages that since the respective packages of the control circuit have a smaller number of input-output terminal pins than required in the prior art, it is unnecessary to design an electronic computer by providing special type flip-flop circuits; the fault-diagnosing apparatus can be produced at a low cost, because a plurality of selectors are connected to a fault-diagnosing unit by a single common fault-diagnosing bus; a microprocessor examines the behavior or the fault-diagnosing bus connected in the wired OR or bus arrangement, thereby enabling the electronic computer to continue its normal processing operation without any interruption and in consequence a decline in its data-processing speed does not occur even when a failure occurs in said fault-diagnosing bus; problems raised with a wired OR type fault-diagnosing bus can be overcome, though indirectly; hardware elements added to an electronic computer for fault-diagnosis can be arranged with higher regularity; and consequently a design engineer can easily design the hardware elements, providing a more reliable fault-diagnosing apparatus for an electronic computer.

What is claimed is:

1. A fault-diagnosing method for an electronic computer system having a central processing unit including a plurality of packages each having sequential circuits which comprises the steps of diagnosing a fault in any of the sequential circuits by using the fault-diagnosing circuits provided in the respective packages; providing a common exclusive fault-diagnosing bus to which the output terminals of the fault-diagnosing circuits are connected; and supplying the fault-diagnosing bus with signals denoting the state of the sequential circuits which have been selected by a fault-diagnosing unit, wherein the fault-diagnosing unit receives the signals denoting the state of the sequential circuits in the selected one of the packages through the exclusive fault-diagnosing bus so as to diagnose a fault which happens to occur in said selected package.

2. The fault-diagnosing method according to claim 1, wherein the fault-diagnosing circuits of the respective packages comprise corresponding selectors; and the method comprises the steps of supplying from the fault-diagnosing unit to the respective selectors with an enable signal and common selection control signal to allow a particular signal denoting the state of a sequential circuit in any of the packages to be sent forth from an enabled selector to the fault-diagnosing bus.

3. The fault-diagnosing method according to claim 1, further comprising the step of throwing the fault-diagnosing bus out of use while the central processing unit makes its normal operation.

4. The fault-diagnosing method according to claim 1, further comprising the step of supplying to the fault-diagnosing unit a clock pulse at a longer interval than that in the central processing unit.

5. The fault-diagnosing method according to claim 4, further comprising the steps of indicating the occurrence of a faulty behavior on a console when the fault diagnosing bus itself is found to have the faulty behavior; and undertaking the loading of a microprogram in the central processing unit independently of the discovery of the faulty behavior of said fault-diagnosing bus.

6. The fault-diagnosing method according to claim 1, further comprising the step of examining the behavior of the fault-diagnosing bus each time power supply is initiated to the central processing unit.

7. The fault-diagnosing method according to claim 6, further comprising the steps of connecting the central processing unit including the fault-diagnosing unit and a console together by an exclusive interface; and indicating the failure of the fault-diagnosing bus itself on the console through the exclusive interface.

8. The fault-diagnosing method according to claim 1, further comprising the step of effecting a test of the behavior of the diagnosis bus each time an initialization of the system is performed.

9. The fault-diagnosing method according to claim 1, further comprising the step of testing the behavior of the fault-diagnosing bus each time a microprogram is loaded in the control storage of the central processing unit.

10. The fault-diagnosing method according to claim 9, further comprising the steps of connecting the central processing unit including the fault-diagnosing unit and a console together by an exclusive interface; and indicating the failure of the fault-diagnosing bus itself on the console through the exclusive interface.

* * * * *